THREE-PHASE BIMETAL OVERLOAD RELAY

Original Filed Oct. 18, 1966 3 Sheets-Sheet 1

INVENTOR.
HAROLD E. WHITING
WALTER C. KARCH
DAVID B. McFADDEN
BY William A. Schmeling

THREE-PHASE BIMETAL OVERLOAD RELAY

Original Filed Oct. 18, 1966 3 Sheets-Sheet 2

INVENTOR.
HAROLD E. WHITING
WALTER C. KARCH
DAVID B. McFADDEN

BY William H. Schmeling

THREE-PHASE BIMETAL OVERLOAD RELAY

Original Filed Oct. 18, 1966 3 Sheets-Sheet 3

INVENTOR.
HAROLD E. WHITING
WALTER C. KARCH
DAVID B. McFADDEN
BY William J. Schmeling United States Patent Office Re. 27,024
Reissued Jan. 12, 1971

27,024

THREE-PHASE BIMETAL OVERLOAD RELAY

Harold E. Whiting, Milwaukee, and Walter C. Karch, Grafton, Wis., and David B. McFadden, Freeport, Ill., assignors to Square D Company, Park Ridge, Ill., a corporation of Michigan Original No. 3,422,317, dated Jan. 14, 1969, Ser. No. 587,471, Oct. 18, 1966. Application for reissue Oct. 8, 1969, Ser. No. 882,759
Int. Cl. H02h *3/00, 3/28, 71/16*
U.S. Cl. 317—46 12 Claims

Matter enclosed in heavy brackets [ ] appears in the original patent but forms no part of this reissue specification; matter printed in italics indicates the additions made by reissue.

*ABSTRACT OF THE DISCLOSURE*

*An overload relay having three identical operating bimetal elements, a snap switch, and a lever arrangement for transmitting the movements of the operating bimetal elements to the push button of the snap switch when the operating bimetals are heated. An ambient-compensating bimetal element that is identical to the operating bimetal elements has an operative connection with the lever arrangement for compensating the effect of movement of the operating bimetal elements for variations in ambient temperature. The relay also includes a means for causing the snap switch to be actuated when less than all of the operating bimetal elements are heated to a temperature lower than the temperature required to actuate the snap switch when all of the operating bimetals are heated and a means to vary the time required to actuate the snap switch in accordance with the rate at which the bimetals are heated.*

This invention relates to thermally operated protective devices and more particularly to devices of the type used to open a circuit upon a current overload in any number of a plurality of circuits as may be used to supply a multiphase electric motor.

Thermally operated devices, known as overload relays, are used to protect electric apparatus, such as electric motors, against continued operation when the line current drawn is excessively high as may be caused by overloading the machine driven by the motor, excessively low line voltage, or single phase operation of a polyphase motor. As the overload relays and the apparatus protected thereby may be subjected to different environments, the switch according to the present invention is provided with means for compensating for the effect of ambient temperature whereby the switch will respond to the same overload conditions, regardless of variations in the temperature of the surrounding atmosphere. In addition, the switch according to the present invention is provided with a means to cause the switch to perform differently during conditions of high current overloads than during modest overload conditions with the means being arranged to cause the operation of the switch to be accelerated during high current overload conditions.

The switch according to the present invention also provides an advantage as the switch will operate when less than all of the operating bimetal elements are heated to a temperature that is lower than the temperature rise required to actuate the switch when all of the operating bimetal elements are heated. Thus the switch according to the present invention will operate in response to lower currents when a polyphase motor is operating as a single phase motor under conditions that would damage the motor than when all phases of the motor are energized.

Because of variations in materials and manufacturing tolerances, bimetal elements of different designs may not react alike to different temperature changes. Thus in manufacturing a switch wherein the shape and/or characteristics of the ambient compensating bimetal element is required to be different than the operating bimetal elements, difficulties will arise in matching the characteristics of the two different designs of bimetal elements to obtain a switch that may be readily calibrated and function properly throughout its entire current and temperature range. In the switch according to the present invention, as the operating bimetal elements and the ambient compensating bimetal element are identical, the selection of the bimetal elements and calibration of the switch during manufacture is simplified.

It is an object of the present invention to compensate the operation of a bimetallic type overload relay for virations in ambient temperature with a bimetal element that is identical to the current monitoring bimetal elements of the overload relay.

An additional object is to provide an overload relay with a plurality of heat responsive operating bimetal elements, a snap switch, a lever arrangement for transmitting movements of the bimetal elements to an operator of the snap switch when the bimetal elements are heated and a means for causing the snap switch to be actuated when less than all of the bimetal elements are heated to a temperature that is lower than the temperature required to actuate the snap switch when all of the bimetal elements are heated.

A further object is to provide an overload relay with a plurality of heat responsive bimetal operating elements, a snap switch, a lever arrangement for transmitting movements of the bimetal elements to an operator of the snap switch when the bimetals are heated and a means for varying the time required to actuate the snap switch with variations in the rate at which the bimetals are heated.

Another object is to provide an overload relay with a plurality of identical heat responsive operating bimetal elements, a snap switch, a lever arrangement for transmitting movements of the operating bimetal elements to the operator of the snap switch when the operating bimetals are heated, and means including an additional bimetal element that is identical to the operating bimetal elements and has an operating connection with the transmitting lever arrangement for compensating the movement of the operating bimetal elements for variations in ambient temperature and for causing the snap switch to be actuated when less than all of the bimetal elements are heated to a temperature that is lower than the temperature required to actuate the snap switch when all of the bimetals are heated.

And another object is to provide an overload relay with a plurality of identical heat responsive operating bimetal elements, a snap switch, a lever arrangement for transmitting movements of the operating bimetal elements to the operator of the snap switch when the operating bimetals are heated, means including an additional bimetal element that is identical to the operating bimetal elements and has an operating connection with the transmitting lever arrangement for compensating the effect of movement of the operating bimetal elements for variations in ambient temperature, a means for causing the snap switch to be actuated when less than all of the bimetal elements are heated to a temperature that is lower than the temperature required to actuate the snap switch when all of the bimetals are heated, and a means for varying the time required to actuate the snap switch with variations in the rate at which the bimetals are heated.

Further objects and features of the invention will be readily apparent to those skilled in the art from the specification and appended drawings illustrating certain preferred embodiments in which.

Figure 1:
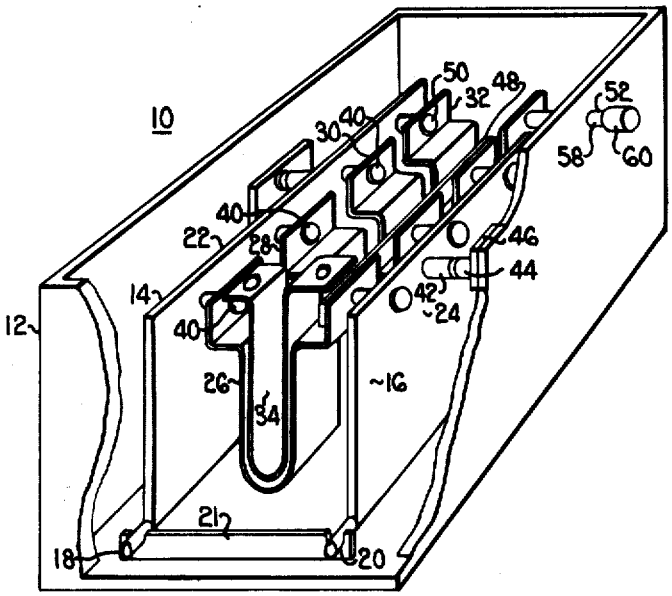
FIG. 1 is a schematic perspective view of an overload relay mechanism according to the present invention.
Figure 2:
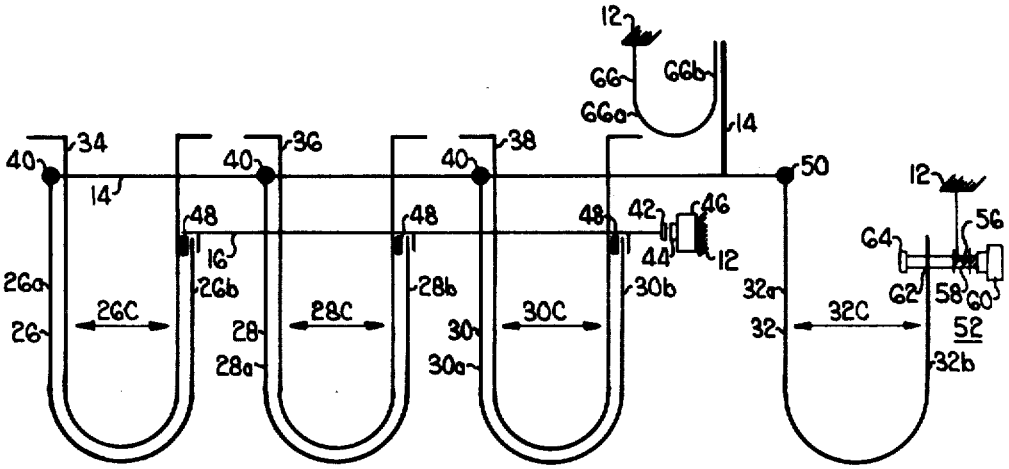
FIG. 2 is a diagrammatic diagram of certain elements of the overload relay mechanism in FIG. 1.
Figure 3:
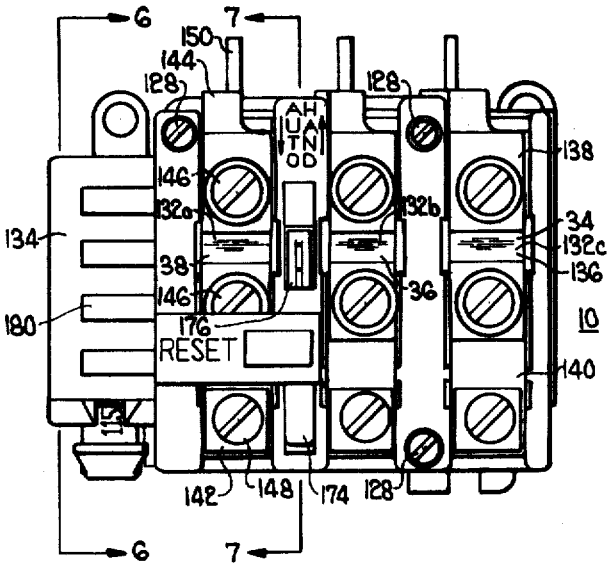
FIG. 3 is a top plan view of an overload relay mechanism incorporating the elements illustrated in FIGS. 1 and 2.
Figure 4:
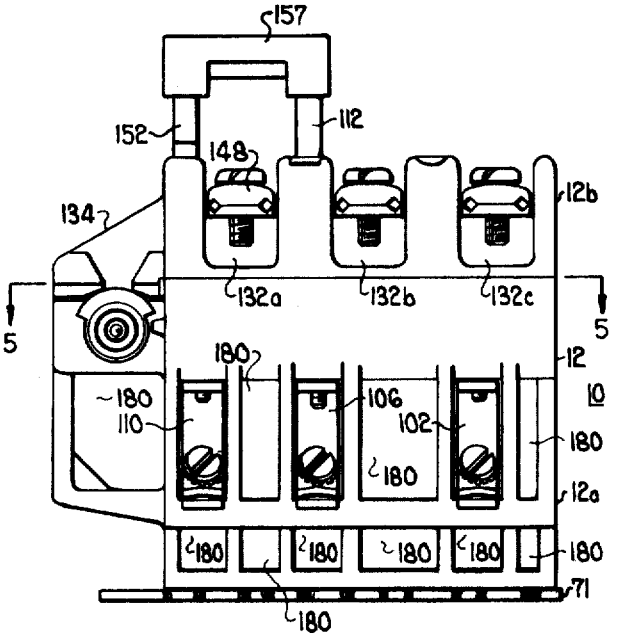
FIG. 4 is a front elevational view of the overload relay mechanism shown in FIG. 3.

In FIGS. 1 and 2 a functional model of a thermally operated protective switch or device 10 according to the present invention is illustrated. The switch 10 has a housing 12, of molded insulating material, wherein a pair of spaced levers 14 and 16 rotate about a pair of spaced and parallel pivot axes. As shown, the lever 14 is provided with a pivot 18 and the lever 16 with a pivot 20. The pivots 18 and 20 are carried by a member 21 secured to a bottom wall of the housing 12. An additional similar member, not shown, carrying similar pivots, is provided at the other end of the housing 12 to permit relative independent movement between a free end portion 22 on the lever 14 and a free end portion 24 on the lever 16.

Positioned between the levers 14 and 16 are four identical U-shaped bimetal elements 26, 28, 30 and 32. Each of the bimetal elements 26–32 is formed of bimetal strip material to have a pair of spaced arms designated by suffices a and b that spread in the direction of indicating arrows 26c, 28c, 30c and 32c when the bimetal elements are heated. The bimetal elements 26–32 are arranged to have the bimetals 26, 28 and 30 act as operating bimetal elements each responding to the heating effects of currents through separate circuits and the bimetal element 32 provides ambient compensation for the switch 10. The bimetals 26, 28 and 30 are respectively coupled with heating elements 34, 36 and 38, as shown in FIG. 2.

In FIG. 1, for purposes of clarity, only a single heat-in element 34 is shown as coupled with the bimetal element 26. When the switch 10 is used with a three-phase motor, not shown, the heating elements 34, 36 and 38 are connected to be heated by the current flow in the individual motor windings. The heating elements 34, 36 and 38 as shown are U-shaped and are positioned in heat radiating relation between the spaced arms of the U-shaped bimetal elements to heat the bimetal elements 26, 28 and 30 in response to current flow through the motor windings. The ends of arms 26a, 28a and 30a of the bimetals 26, 28 and 30 are secured to the portion 22 of the lever 14 as by rivets 40. The ends of arms 26b, 28b and 30b of the [levers] *bimetals* 26, 28 and 30 are not fixed and rest against the portion 24 of the lever 16. The lever 16 has a portion 42 engaging an operator 44 of a snap switch 46. The snap switch 46 preferably is of the type requiring minimal movement of the operator 44 before moving its contacts with a snap action from a circuit closing position to a circuit opening position when a predetermined force is applied to the operator 44.

The ends 26b, 28b and 30b are positioned between the portion 24 and fixed stops 48 formed as part of the housing 12. As shown in FIG. 1, the stops 48 are located to limit the movement of ends 26b, 28b and 30b toward the lever 14.

The ambient temperature compensating bimetal element 32 has arms 32a and 32b which spread in response to an ambient temperature increase. The arm 32a is secured to the lever 14 by a rivet 50. The arm 32b is adjustably positionable relative to the housing 12 by an adjustment means 52. The adjustment means 52 includes a rotatable member 56 having a threaded portion 58, an adjustment knob 60, a portion 62 extending through an opening in the arm 32b and a stop 64 on the end of portion 62. The stop 64 is positioned to engage an inner surface of the arm 32b and limit movement of the arm 32b toward the arm 32a. The opening in the arm 32 receives the portion 62 with clearance permitting the arm 32b to move out of engagement with the stop 64. The knob 60 is used to rotate the member 56 and because of a threaded connection between the housing 12 and the threaded portion 58, the relative positions of the stop [62] *64* and the arm 32b may be adjustably varied.

The switch 10 also includes an additional bimetal element 66, known as a tripping accelerator bimetal. The bimetal element 66 may have a different shape and load characteristics than the bimetal elements 26, 28, 30 and 32 and has an arm portion 66a secured to the housing 12 and an arm portion 66b engageable with the lever 14. The bimetal element 66 has the same deflection characteristics as the bimetal elements 26, 28, 30 and 32 and is constructed to have the ends of the arms 66a and 66b move toward each other when the bimetal element 66 is heated. The bimetal element 66 is positioned in the housing 12 to be heated by the heaters 34, 36 and 38 at a slower rate than the bimetal elements 26, 28 and 30.

Referring to FIG. 2, the operation of the switch 10 will now be described. During normal ambient temperature and nonoperating conditions, the heating elements 34, 36 and 38 will not be subjected to current and the arms of the bimetal elements 26, 28 and 30 as well as the bimetal element 66 will be relaxed. Thus the levers 14 and 16 will not be subjected to any force and will in effect float in the housing 12 and the lever 16 will be free to engage either the actuator 44 or the arm portions 26b, 28b and 30b without exerting a force on either the arm portions or the actuator. Similarly, the lever 14 will be disengaged from the arm 66b and position the arm 32b a predetermined distance from the stop 64.

When all of the heaters 34, 36 and 38 are heated by normal motor current, the arms 26a–26b, 28a–28b and 30a–30b will spread, causing a movement of the arms 26a, 28a, 30a to the left and a movement of the arms 26b, 28b and 30b to the right. The movement to the right of the arms 26b, 28b and 30b causes the lever 16 to move to the right and impress a force against the actuator 44. The force on the actuator 44 is resisted by the mechanism of the snap switch 46. As previously stated, the snap switch 46 is selected to require a predetermined applied force on actuator 44 before the contacts will move with a snap action from a circuit closing to a circuit opening position and the snap action of the contacts will occur upon a minimal distance of travel of the actuator 44.

As the lever 16 is prevented from movement to the right by the opposing force supplied by the actuator 44, the arm portions 26a, 28a and 30a will move lever 14 and the bimetal element 32 to the left to a position wherein the arm 32b engages the stop 64. The foregoing movement of the lever 14 and the bimetal element 32 will be unopposed by the bimetal element 32 because of the lost motion connection provided by the distance the arm 32b is required to move on the portion 62 before engaging the stop 64. Further movement of the lever 14 to the left after engagement of the arm 32b with the stop 64 is resisted by the bimetal element 32 which acts as a resilient means having identical spring characteristics as the bimetal elements 26, 28 and 30. The movement to the left of the lever 14 continues until the force exerted by the bimetals 26, 28 and 30, that is resisted by the bimetal 32, stabilizes at a value less than the force required to move the operator 44 and actuate the snap switch 46.

When a current higher than normal occurs in each of the heaters 34, 36 and 38, the force exerted by the bimetals 26, 28 and 30, as resisted by the bimetal 32, progressively increases to the value required to move the operator 44 and actuate the switch 46.

In the event of failure of one of the phases of the motor protected by the switch 10, two of the heating elements will be heated and the remaining heating element will not be heated. Assuming a condition wherein the circuit connected to the heating element 38 is open and not carrying current and the circuits connected to the heating elements 34 and 36 are subjected to an excess current, the switch 10 will operate as follows. The heating effect of the abnormal excess current through the heating elements 34 and 36 causes movement of the arms 26a and 28a to the left and movement of the arms 26b and 28b to the right. The movement to the right of the arms [26a] *26b* and 28b causes the lever 16 to move to the right and impress a force against the actuator 44. As the movement of the lever 16 is opposed by the actuator 44, the arm portions 26a and 28a will urge the lever 14 and the bimetal element 32 toward the left. The motion of the lever 14 to the left is instantly opposed by the bimetal element 30 as the arm portion 30b engages the stop 48. After the lever 14 has moved a predetermined distance to the left to a position wherein the arm 32b engages the stop 64, further movement of the lever 14 to the left will be resisted by both bimetal elements 30 and 32 each acting as a resilient means having identical spring characteristics as the operating bimetals 26 and 28. The movement to the left of the lever 14 will continue until the force exerted by the bimetal elements 26 and 28, as resisted by the bimetal elements 30 and 32, equals the forced required to move the operator 44 to actuate the snap switch 46.

While useful in other types of motor circuits, the switch according to the present invention is particularly suited for use in a circuit wherein a Y-delta transformer provides a supply for a three-phase motor. In event of failure in one of the phases of the primary side of the transformer, two of the phases of the motor will be excited with a slightly increased current while the remaining phase will be excited with current in excess of twice the normal value. Thus under conditions wherein a three-phase motor supplied by Y-delta transformer is operating under a load significantly less than its rated load, and a failure occurs in one of the phases of the primary side of the transformer, two of the phases of the motor will be supplied with less than the normal currents required to trip the switch 10 while the third phase will be supplied with current in excess of the normal currents. In the event the switch 10 has its heating elements 34, 36 and 38 connected in circuits having an excess current in one of the circuits and less than normal current in the two remaining circuits, one of the heating elements will be heated excessively and the two remaining heating elements will be heated less than normal. Assuming a condition wherein the circuits connected to the heating elements 36 and 38 are carrying less than normal currents and the circuit connected to the heating element 34 is subjected to an excess current, the switch 10 will operate as follows: the heating effect of the excess current through the heating element 34 will cause movement of the arm 26a to the left and movement of the arm 26b to the right. The movement to the right of the arm [26c] *26b* causes the lever 16 to move to the right and impress a force against the actuator 44. As the movement of the lever 16 is opposed by the actuator 44, the arm portion 26a will urge the lever 14 and the bimetal element 32 toward the left. This motion of the lever 14 to the left is opposed by the bimetal elements 28 and 30 as the arm portions 28b and 30b engage the stop 48. After the lever 14 has moved a predetermined distance to the left to a position wherein the arm 32b engages the stop 64, further movement of the lever 14 to the left will be resisted by bimetal elements 28, 30 and 32 each acting as a resilient means having identical spring characteristics as the operating bimetal 26. The movement to the left of the lever 14 will continue until the force exerted by the bimetal element 26, as resisted by the bimetal elements 28, 30 and 32, equals the force required to move the operator 44 and actuate the snap switch 46.

The switch 10 has its levers and bimetal elements arranged to actuate the snap switch 46 when any number less than all of operating bimetal elements 26, 28 and 30 are heated to a temperature that is less than when all of the operating bimetal elements 26, 28 and 30 are heated. This can be mathematically demonstrated in the following examples wherein:

F—pounds of force required to trip the snap switch $\Delta T_n$—temperature change required to heat operating bimetal elements to trip switch d—total distance bimetal arms 26a, 28a and 30a move to provide force to trip snap switch r—distance ambient compensating bimetal arm 32a moves when operating bimetals are heated i—distance bimetal arms 26a, 28a and 30a move to take up lost motion connection between the arm 32a and stop 64 a—force constant in lbs./degrees F of the bimetals 26, 28, 30 and 32 c—motion constant in inches/degrees F of the bimetals 26, 28, 30 and 32

K—bimetal spring constant a/c=lbs./inch

THREE OPERATING BIMETAL ELEMENTS HEATED

The three operating bimetal elements 26, 28, and 30 each are equally heated and equally share the required force F. Thus to develop the required force F the bimetal elements 26, 28 and 30 must be heated F/3a. Further, the three operating bimetal elements 26, 28 and 30 must be additionally heated to deflect the unheated bimetal 32 a distance sufficient to provide the force F.

Therefore $$\Delta T_3=\frac{F}{3a}+\frac{i}{c}+\frac{r}{c}$$

substituting for r $$\Delta T_3=\frac{F}{3a}+\frac{i}{c}+\frac{F}{a}$$

Solving $$\Delta T_3=\frac{4F}{3a}+\frac{i}{c}$$

Bimetal element 32 supplies entire force F $$\therefore F=rK$$

Solving for r $$r=[F/K]\frac{F}{K}$$

Substituting a/c for K $$r=[Fc/a]\frac{Fc}{a}$$

TWO OPERATING BIMETAL ELEMENTS HEATED (ASSUME BIMETAL ELEMENTS 26 AND 28 HEATED)

The two operating bimetal elements 26 and 28 each equally share the required force F and to develop the required force F must be heated F/2a. Further, the two operating bimetal elements 26 and 28 must be additionally heated to deflect the bimetal elements 30 and 32 a sufficient distance to provide the force F.

$$\Delta T_2=\frac{F}{2a}+\frac{i}{c}+\frac{r}{c}$$

Substituting for r $$\Delta T_2=\frac{F}{2a}+\frac{i}{c}+\frac{F}{2a}-\frac{i}{2c}$$

Solving $$\Delta T_2=\frac{F}{a}+\frac{i}{2c}$$

Bimetal elements 32 and 30 share force F $$\therefore F=rK+(i+r)K$$

Solving for r $$r=\frac{F}{2K}-\frac{i}{2}$$

Substituting $$[a/c]\frac{a}{c}$$

$$r=\left[\frac{Fc}{2a}+\frac{i}{2}\right]\frac{Fc}{2a}-\frac{i}{2}$$

ONE OPERATING BIMETAL HEATED (ASSUME BIMETAL ELEMENT 26 HEATED)

$$\Delta T_1=\left[\frac{F}{a}-\frac{i}{c}+\frac{r}{c}\right]\frac{F}{a}+\frac{i}{c}+\frac{r}{c}$$

Substituting for r $$\Delta T_1=\frac{F}{a}+\frac{i}{c}+\frac{F}{3a}-\frac{2i}{3c}$$

Solving $$\Delta T_1=\frac{4F}{3a}+\frac{i}{3c}$$

Bimetal elements 32, 30 and 28 share force F $$\therefore F=rK+(i+r)K+(i+r)K$$

Solving for r $$r=\frac{F}{3K}-\frac{2i}{3}$$

Substituting for K $$r=\frac{Fc}{3a}-\frac{2i}{3}$$

In previous designs of bimetal overload switches the speed with which the switch is actuated when excess current occurs is a function of the degree of excess current and the rate of heat transfer from the heating elements through which the excess current flows and the bimetal responsive elements. In the switch according to the present invention the speed is accelerated by the action of the bimetal 66 which functions as follows.

When the heating elements are carrying normal currents, as previously described, a portion of the heat generated is transferred by convection around the actuating bimetals 26, 28 and 30 to the accelerating bimetal 66. The accelerating bimetal 66 reacts by deforming *with* the ends of the arms 66a and 66b moving toward each other with the arm 66b retreating from the lever 14 at at least the same rate as lever 14 is advanced by the actuating bimetal elements 26, 28 and 30. Thus the bimetal 66 will not influence the operation of the switch 10 during normal operating conditions.

If, however, the switch is in a cold, unoperative state and a sudden abnormal excess current, such as six times normal current, is caused to flow through the heater elements 34, 36 and 38 over an abnormal period of time, bimetal elements 26, 28 and 30 will be fully exposed to heating effects of the current for the entire period of current flow and respond by deflecting while the convection heat will be delayed in reaching the accelerator bimetal 66. Accordingly, the accelerator bimetal 66 will not materially deflect. Therefore lever 14, which under the normal conditions previously described was restrained only by bimetal 32, now under abnormal conditions as caused by a sudden flow of excess current for an abnormal period through the heating elements 34, 36 and 38, is additionally restrained by bimetal 66. Thus a lower temperature difference and less time is required to cause sufficient force to be developed by the bimetal elements 26, 28 and 30 on operator 44 to actuate switch 46. Also, if desired, the arm 66a may be adjustably attached to housing 12 to provide an adjustable lost motion space between arm 66a and lever 14. When this adjustment, not shown, is provided, the effect of bimetal 66 under abnormal conditions of excess current may be varied to permit the operating time response of the switch 10 to conditions of sudden abnormal excess current to be adjusted to compensate for different types of loads that may be imposed on the motor.

In FIGS. 3–7 an operative embodiment of the switch incorporating the features of the present invention as described in connection with the embodiment in FIGS. 1 and 2 is shown wherein the elements corresponding to similar elements in FIGS. 1 and 2 are similarly designated.

Figure 5:
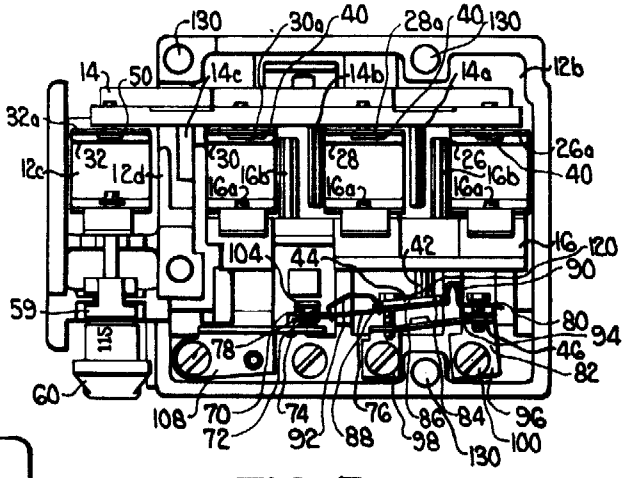
FIG. 5 is a top plan view of the overload relay mechanism with a top portion of a housing for the overload relay removed and taken along line 5—5 in FIG. 4.

The housing 12 of the switch 10 in FIGS. 3–7 is formed of two molded parts designated as a base 12a and a cover 12b. The base 12a is secured to a mounting plate 71 by means of the screws extending through the mounting plate 71 and the bottom wall of the base 12a into the members 21. The base 12a has an internal cavity. As shown in FIG. 5, the cavity is divided into two cavity portions 12c and 12b by a barrier 12d. The barrier 12d serves as a heat barrier and isolates the cavity 12c, wherein the ambient compensated bimetal 32 is received, from the cavity 12b wherein the operating bimetals 26, 28 and 30 are received. Positioned within the cavity 12b is the lever 16. The lever 16 has spaced projections 16a thereon extending with clearance through suitable openings in the arms 26b, 28b and 30b of the operating bimetal elements permitting the lever 16 to be moved by one or more of the arms 26b, 28b and 30b independently of the remaining arms. The lever 16 additionally has a pair of spaced projections 16b thereon which act as heat barriers and are located to effectively divide the cavity 12b into three compartments each having a bimetal 26, 28 and 30 positioned therein. Additionally, the portion 42 on the lever 16 engaging the actuator 44 of the snap switch 46 is adjustable.

Figure 6:
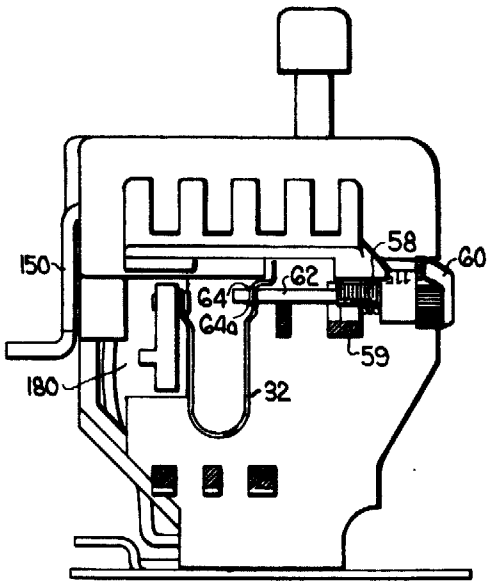
FIG. 6 is a view partly in cross-section taken along line 6—6 in FIG. 3.

The lever 14 extends across compartments 12b and 12c and includes three spaced projections 14a b and c. The projections 14a and 14b are positioned adjacent the projections 16b and cooperate with the projections 16b to provide a heat insulating barrier between the compartments wherein the bimetal elements 26, 28 and 30 are located. The projection 14c is positioned adjacent the barrier 12d and cooperates with the barrier 12d to provide a heat barrier between the ambient compensated bimetal element 32 and the heating elements for operating bimetal elements 26, 28 and 30. The arms 26a, 28a and 30a each are secured to the lever 14 by the rivets 40. Similarly, the arm 32a of the bimetal 32 is secured to the lever 14 by the rivet 50. As shown in FIG. 6, the adjustment means 52 for the bimetal 32 includes the knob 60, the threaded portion 58, which is threadedly received in a nut 59 carried by the housing part 12a, and the portion 62 carrying the stop 64. In the embodiment shown, the stop 64 is formed as a clip 64a that is received in a suitably formed groove in the portion 62.

Figure 7:
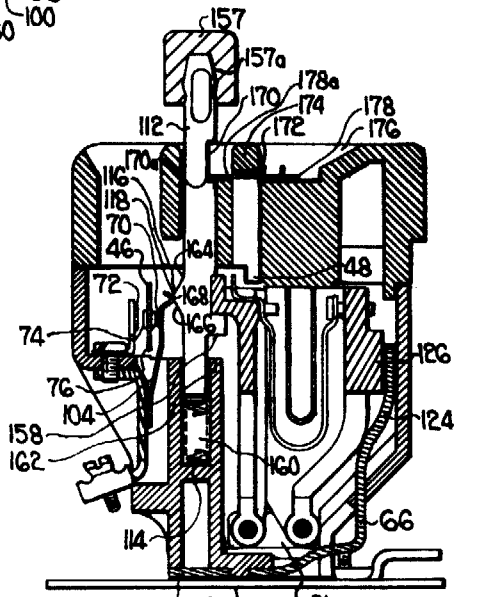
FIG. 7 is a cross sectional view taken generally along line 7—7 in FIG. 3.

Referring to FIGS. 5 and 7, the snap switch 46, which per se is not part of the present invention, includes a pair of spaced stationary contacts 70 and 72 and a movable contact 74 carried on a resilient member 76 to alternately engage the contacts 70 and 72.

The resilient member 76 is formed to have a pair of parallel slots extending between an end 78 carrying the movable contact 74 and an end 80 secured to a support 82. The slots divide the member 76 to provide the member 76 with a pair of outer legs 84 extending between the ends 78 and 80 and a central leg 86. The central leg 86 extends from the end 80 to present a free end 88 spaced from the end 78. The resilient member 76 also has portions of the outer legs 84 and the central leg adjacent the end 80 formed as folded portions 90 to permit the length of the legs 84 and the leg 86 to independently vary. Interconnecting the free end 88 and the end 78 is a C-shaped member 92. The member 92 constantly causes the leg 86 to be subject to a compressive force while the legs 84 are under tension. Thus the resilient member 76 and the member 92 act as a toggle mechanism alternately resiliently forcing the leg 86 either in one direction to a position wherein the contact 74 engages the contact 70, or in an opposite direction to a second position wherein the contact 74 engages the contact 72.

The support 82 is formed of a conducting metal part having a body portion 94 extending perpendicular to a pair of spaced feet 96 and 98. The feet 96 and 98 are secured to portions of the base 12a by screws 100. The screw 100 securing the foot 96 electrically connects the support 82 to a terminal and wire clamping member 102 shown in FIG. 4. As shown in FIG. 7, a flexible strip 104 has the stationary contact 70 secured at one end and its other end secured to a terminal and wire clamping member 106 shown in FIG. 4. The stationary contact 72 is carried in spaced relation to the contact 70 on the opposite side of the resilient member 76 by a support 108. The support 108 also is connected to a terminal and wire clamping member 110 shown in FIG. 4.

When the contact 74 engages the contact 70 the switch will be in a condition known as the tripped position, wherein a circuit between the terminals 102 and 110 is completed through the support 82, the resilient member 76, the contacts 74 and 70 and the support 108. As shown in FIG. 7, the components of the snap switch 46 are placed in the reset condition by depressing a plunger 112 against the force of a return spring 114 to a position wherein a projection 116 on a side wall of the plunger 112 engages a bearing surface 118 on the strip 104 and causes movement of the contact 70 and the contact 74 toward the contact 72. The movement of the contact 74 causes the member 76 and the C-shaped member 92 to move to an overcenter position whereby the member 76 automatically moves with a toggle action to a reset position and resiliently maintains the engagement between the contact 74 and the contact 72. Further travel of the central leg 86 after the contacts 72 and 74 are engaged is limited by a stop 120 provided by the head of a screw having a threaded shank extending through an opening in the central leg 86 and adjustably threaded into an opening in the body portion 94. The operator of the snap switch 46 corresponding to the operator 44 in FIGS. 1 and 2 is provided by the portion 42 having one end engageable with a portion of the central leg 86 located intermediate the stop 120 and the folded portion 90. The portion 42 is adjustably threaded into an insert in the lever 16 whereby the point of operating engagement of the operator 44a and the central leg 86 may be adjusted when the lever 86 is moved toward the reset condition.

The accelerating bimetal element 66, as shown in FIG. 7, is formed as an L-shaped member having a base portion 122 positioned in a groove in a bottom outside surface of the base 12a between the base 12a and the mounting plate 71 and an arm 124 spaced from the bimetals 26, 28 and 30 extending between the lever 14 and the walls forming the cavity 12. The arm 124 has a portion located to engage a projection 126 on the lever 14. The material forming the bimetal element 66 is selected to have the arm 124 move away from the projection 126 when the bimetal 66 is heated to function as previously described in connection with FIGS. 1 and 2.

The cover 12b is secured to a top wall of the base 12a by screws 128 extending through suitable openings in the cover 12b into threaded engagement with threaded inserts 130 in the base 12a. The cover 12b has three spaced open ended compartments 132a, 132b and 132c extending across its top surface to be respectively vertically aligned with the bimetal elements 26, 28 and 30 and a portion 134 providing a top wall for the cavity 12c. The compartments 132a, 132b and 132c are substantially identical and each have openings 136 therein vertically aligned with the space between the arms a and b of the bimetal elements 26, 28 and 30 and the ledges 138 and 140 extending on opposite sides of the openings 136. The ledges 138 and 140 are provided with a suitable means for securing conductor members 142 and 144 in the respective compartments on opposite sides of the openings 136. The conductor members 142 and 144 have suitable threaded openings for receiving screws 146. The screws 146 provide an attachment for connecting opposite ends of the heater elements 34, 36 and 38 between the conductor members 142 and 144. Each heater element 34, 36 and 38 is U-shaped, having arm portions extending from the members 142 and 144 downwardly through the openings 136 in spaced relation with the arm portions a and b of the bimetal elements 26, 28 and 30. The heater elements thus are heated by current flow between the members 142 and 144 and are arranged to heat the bimetals 26, 28 and 30 in response to the current flow. The member 142 has a threaded opening receiving a fastening screw of a wire clamping assembly 148. The wire clamping assembly 148 is arranged to secure bared ends of an electrical conductor extending from the electrical load to be monitored and not shown. The member 144 has a portion 150 extending outwardly of a side wall of the switch 10 and is preferably arranged to be clamped in a wire clamping member on an electrical switch known as a contactor, in a manner disclosed in [an application for U.S. patent, Ser. No. 472,599, filed July 16, 1965,] *U.S. Pat. No. 3,304,522, issued Feb. 14, 1967,* and assigned by the inventors Joseph J. Gribble and Kenneth J. Marien to the assignee of the present invention.

Extending downwardly from the bottom surface of the cover 12b and located to be engaged by the arms 26b, 28b and 30b, as shown in FIG. 7, are three spaced stops 48 each integrally formed on the cover 12b and extending into the cavities wherein the bimetals 26, 28 and 30 are positioned. The stops 48 limit movement of the arms 26b, 28b and 30b as described in connection with FIGS. 1 and 2. Extending downwardly through the cover 12b are a pair of spaced openings wherein a leg 152 and the plunger 112 of a reset button are movable. The leg 152, which is integrally formed with the button portion 157 acts as a guide and is sized not to extend into the base 12a, when the button 157 is fully depressed. The plunger 112 has an end received in a socket 157a in the button portion to maintain the button portion 157 and the plunger 112 assembled.

A stop portion 158 extending from a sidewall on the plunger 112 is engageable with a bottom surface of the cover 12c to limit upward movement of the plunger 112 in the switch 10 by the spring 114. The spring 114 is positioned in a socket 160 vertically aligned with the opening in the cover 12b through which the plunger 112 extends. The socket 160 is formed in the material of the base 12a to receive a portion of the plunger 112 to guide the plunger 112 during its movements and to present a surface 162 that is engaged by the portion 158 to limit the downward movement of the plunger 112. The projection 116 is formed as a pair of inclined surfaces 164 and 166 intersecting at an apex 168. The inclined surfaces 164 and 168 are arranged so the bearing surface 118 engages a portion of the plunger 112 above the inclined surface 164 when the stop portion 158 engages the stop surface 162 and a portion of the plunger 112 below the inclined surface 166 when the stop portion 158 engages the bottom surface of the cover 12b. As previously described, the apex 168 on the projection is arranged to engage the bearing surface 118 for the purpose of moving the flexible mounting strip 104 to a position whereby the member 76 automatically moves with a toggle action to the reset position. The plunger 112 additionally is provided with a notch 170 aligned with a slot 172 in the barrier 174 between the compartments 132a and 132b. A recess 176 in the barrier 174 having a bottom wall forming an extension of the slots 172 receives a slide 178. The slide 178 has a portion 178a extending into the slot 172 and is movable between two extreme positions in the recess 176. When the slide 178 is in one position its portion 178a is out of the path of movement of the plunger 112. When the slide 178 is in its second position, as shown in FIG. 7, the portion 178a will be received in the notch 170 whereby a bottom edge 170a of the notch 170 engages the portion 178a and maintains the plunger 112 in a position wherein the apex 168 constantly engages the bearing surface 118. When the plunger 112 is thus maintained in position by the slide 178, the flexible mounting strip 104 will position the contact 70 to cause the toggle action of the member 76 to occur automatically. Thus when the switch 10 operates in response to an overload condition wherein the lever 16 causes movement of the member 76 to the tripped position wherein the contact 74 engages the contact 70, a subsequent cooling of the bimetals 26, 28 and 30 will remove the force exerted by the lever 16 on the member 76 and the member 76 will automatically move with a toggle action to the reset position wherein the contact 74 engages the contact 72. In normal practice the contact 72 is connected in circuit with an operating magnet coil of an electromagnetically operated switch having contacts controlling circuits through the heating elements 34, 36 and 38. The contact 70 is connected in circuit with an alarm or other indicating device. Thus when the contact 74 engages the contact 72, completing the circuit to the operating coil for operating the electromagnetic switch to complete the circuits through the heating elements 34, 36 and 38 as well as the load circuits monitored by the switch 10, if the overload condition previously sensed by the switch 10h has ceased to exist, the switch 10 will remain in a reset condition. However, should the overload condition continue, the excess current through the heaters 34, 36 and 38 will cause movement of the bimetal elements 26, 28 and 30 and levers 14 and 16 and actuate the snap switch 46 to a position wherein the contact 74 moves out of engagement with the contact 72 and into engagement with the contact 70. As the contact 72 is in circuit with the operating coil of the electromagnetic switch controlling the load circuit, the load circuit will be interrupted and the engagement of contact 74 with contact 70 will energize an alarm circuit indicating the occurrence of an overload condition in the load monitored by the switch 10. Thus when the slide 178 is positioned to have the portion 178a within the notch 170, the switch 10 will be adjusted to operate automatically.

As shown in the drawings, the cover 12b and the base 12a are provided with a maximum number of openings 180 exposing to a maximum extent the internal parts of the switch 10 including the bimetal elements 26, 28, 30 and 66, as well as the heating elements 34, 36 and 38. The openings 180 exposing the bimetal 32 permit the switch 10 to more faithfully follow changes in ambient temperatures. The openings exposing the heating elements 34, 36 and 38 as well as the bimetal elements 26, 28, 30 and 66, as well as the other elements within the interior of the switch 10, prevent the transfer of heat to the bimetal element 32 and decrease the interval required to reset the switch 10 after the switch 10 has responded to an overload condition.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A thermally operated protective device for use in a plurality of circuits wherein N equals the number of circuits, comprising: a fixed stop, a pair of levers movable relative to the stop, a snap switch having an operator engaging a first of said pair of levers for actuating contacts of the switch when a predetermined force is applied to the operator by the first lever, N number of identical, heat-response, resilient U-shaped bimetal elements, each of said elements having a pair of ends that move in opposite directions when the element is heated and having a first of said pair of ends attached to a second of said pair of levers and second of said pair of ends positioned to alternately engage the stop and the first lever and provide a force for moving the levers in opposite directions and the first lever in a direction for actuating the snap switch when the bimetal element is heated, N number of heating units each connected to be heated by current flow in one of the circuits and positioned to heat one of the bimetal elements, and means including a resilient element *that is identical to the bimetal elements* for resiliently opposing and absorbing movement of the second lever by the bimetal elements in response to the heating of the bimetal elements by the heating units, said means, second lever and stop being arranged for causing the second end of any unheated bimetal element to engage the stop when any other bimetal element is heated and for preventing movement of the first lever by any heated bimetal element until the force absorbed by the resilient means equals the predetermined force required to move the operator [.] *for compensating the operation of the device for variations in ambient temperature.*

[2. The combination as recited in claim 1 wherein the resilient element is identical to the bimetal elements and provides a means for compensating the operation of the device for variations in ambient temprature.]

3. The combination as recited in claim 1 including a heat responsive means having an operating connection with at least one of the levers and located to be heated by the heating means at a rate different than the bimetal elements for varying the time required to actuate the switch with variations in the rate of heating of the bimetal elements.

[4. The combination as recited in claim 1 wherein the resilient element is identical to the bimetal elements and provides a means for compensating the operation of the device for variations in ambient temperature and including a heat responsive means having an operating connection with at least one of the levers and located to be heated by the heating means at a rate different than the bimetal elements for varying the time required to actuate the switch with variations in the rate of heating of the bimetal elements.]

5. The combination as recited in claim 1 wherein the pair of levers are each pivoted on a portion of a housing for the device.

6. The combination as recited in claim 5 wherein the pair of levers are parallel and the bimetal elements and resilient element are positioned between the pair of levers.

7. The combination as recited in claim 1 wherein the resilient [means] *element* has a pair of ends with one of the ends being attached to the second lever and the other of said ends being attached to a housing for the device and at least one of the pair of attached ends is attached through a lost motion connection whereby the second lever moves a predetermined distance before the resilient [means] *element* initially opposes further movement of the second lever.

8. The combination as recited in claim 1 wherein the snap switch has a member movable between two operative positions and includes means responsive to movement of the operator for moving the member to a first of said two positions and the deivce includes a member guided by a housing for the device that has a portion engageable with the snap switch means for moving the member to a second of said two positions.

9. The combination as recited in claim [4] *3* wherein the heat responsive means includes a bimetal element having characteristics different than the resilient element and having a portion engageable with the second lever.

10. The combination as recited in claim 1 including means for causing the first lever to move and actuate the snap switch when any number less than all of the bimetal elements are heated to a temperature that is lower than the temperature required to actuate the snap switch when all of the bimetal elements are heated.

11. A thermally operated protective device comprising: a fixed stop, a switch having a movable operator for actuating contacts of the switch when a predetermined force is applied to the operator, a first lever movable relative to the stop and having a portion engaging the operator, a second lever movable relative to the stop independently of the first lever, a plurality of *identical* bimetal elements each having a first end attached to the second lever and a second end engageable with the stop when the second end moves in a first direction and engageable with the first lever and supplying a force for moving the first lever and the operator when the second end moves in a second direction, means individual to each bimetal element for heating said elements in response to current flow in individual circuits and causing movement of the ends of the bimetal elements, and resilient means *including a resilient element that is identical to the bimetal elements, said resilient element* having an end engaging the second lever and resiliently opposing and absorbing movement of the second lever and thereby preventing movement of the first lever by the bimetal elements when the bimetal elements are heated by the heating means until the force absorbed by the resilient means equals the predetermined force required to move the operator and actuate the switch contacts.

12. In a thermally operated protective device for use in a plurality of circuits wherein N equals the number of circuits, the combination comprising: a snap acting switch having a movable operator for actuating contacts of the switch when a predetermined force is applied on the operator, a fixed stop, a pair of levers each movable independently relative to the stop, N number of identical, heat-responsive, resilient U-shaped, bimetal elements, each of said bimetal elements having a pair of ends movable in opposite directions when the bimetal is heated with a first of said pair of ends being attached to a first of said pair of levers and a second of said pair of ends being positioned to engage the stop when the second end moves in a first direction and to engage the second of said pair of levers when the bimetal is heated and the second end moves in a second direction, N number of heating elements each connected to be heated by current flow in one of the circuits and positioned to heat one of the bimetal elements, a resilient means having resilient characteristics identical to the resilient characteristics of the bimetal elements, said resilient means having an end engaging the first of said levers for resiliently opposing and absorbing movement of the first lever and thereby preventing movement of the second lever by the bimetal elements when the bimetal elements are heated by the heating elements until the force absorbed by the resilient means equals the predetermined force required to move the operator.

13. An ambient compensated overload relay for use in a plurality of separate circuits wherein N equals the number of circuits, *said relay* comprising N plus one identical, heat-responsive resilient U-shaped bimetal elements and N number of identical heating units each connected to be heated by current flow in *a respective* one of the circuits and positioned to heat *a respective* one of the bimetal elements.

*14. The overload relay as recited in claim 13 including an additional heat responsive bimetal element located to be heated by all of the heating units at a rate different than the other bimetal elements.*

References Cited

The following references, cited by the Examiner, are of record in the patented file of this patent or the original patent.

UNITED STATES PATENTS

| | | | |
|---|---|---|---|
| 2,682,005 | 6/1954 | Hemphill et al. | 317—13X |
| 2,838,718 | 10/1958 | Edmunds | 317—46 |
| 2,928,997 | 3/1960 | Edmunds | 317—46X |
| 3,031,601 | 4/1962 | Rudolph | 317—46 |

FOREIGN PATENTS

| | | |
|---|---|---|
| 498,325 | 1/1939 | Great Britain. |

JAMES D. TRAMMELL, Primary Examiner

U.S. Cl. X.R.

200—113; 317—27